April 23, 1968  J. DOMOKOS ET AL  3,379,066
GENERAL TESTING OF SPRAYABLE PAINTS AND VARNISHES, ESPECIALLY
FROM THE POINT OF VIEW OF THE ELECTROSTATIC SPRAY
Filed Aug. 6, 1965

JOZSEF DOMOKOS
GYORGY BENEDEK
BELA KISS
LASZLO WINKLER
INVENTORS

BY Young & Thompson
ATTYS.

United States Patent Office 3,379,066
Patented Apr. 23, 1968

3,379,066
GENERAL TESTING OF SPRAYABLE PAINTS AND VARNISHES, ESPECIALLY FROM THE POINT OF VIEW OF THE ELECTROSTATIC SPRAY
Jozsef Domokos, Gyorgy Benedek, Bela Kiss, and Laszlo Winkler, Budapest, Hungary, assignors to Hajtomu es Felvonogyar, a firm
Filed Aug. 6, 1965, Ser. No. 477,738
1 Claim. (Cl. 73—432)

ABSTRACT OF THE DISCLOSURE

Sprayability and other characteristics of paints and varnishes may be tested by apparatus comprising a viscosity-measuring jar having a spray head fastened to its bottom and a needle valve adjustable vertically in the orifice of the spray head. The jar is vertically adjustably mounted on and above a grounded pedestal which carries a high-voltage direct current source, by means of a vertical guiding bar which carries a choke resistance and which is covered by an insulating cap marked in scale divisions viewable by an optical device. A separate vessel for testing flash point is carried by the pedestal and has a spark-drawing conical body extending upward from its bottom.

---

Figure 1:
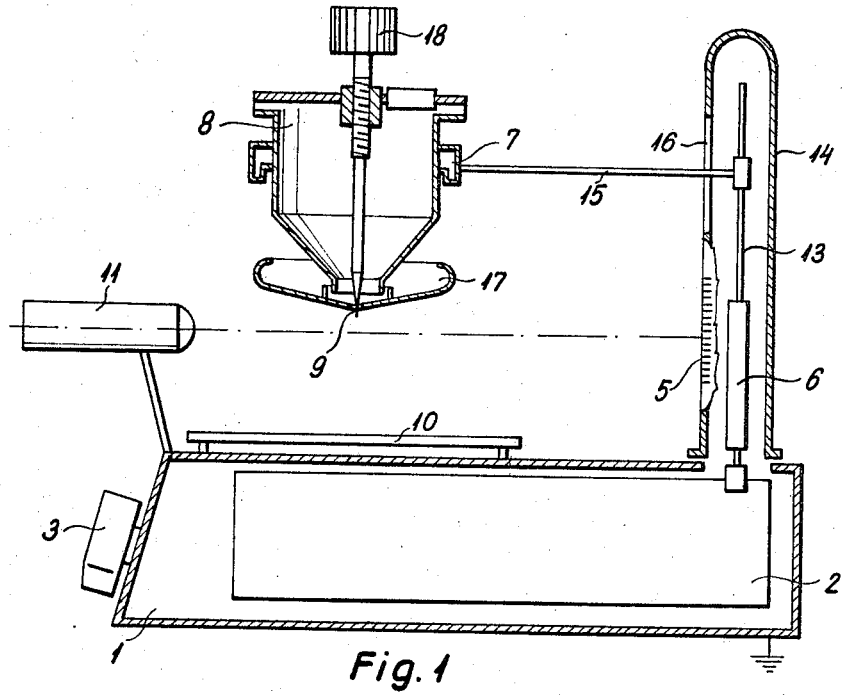

The invention relates to the general testing of sprayable paints and varnishes, especially from the point of view of electrostatic sprays. These tests have been carried out up to now only in premises of the paint and dye factories, with separate instruments for each parameter. These parameters are: (1) pigment content of the paint, (2) size of the pigment grain, (3) viscosity, spreading and sprayability. With electrostatically sprayable paint, further tests have been carried out for determining: (4) the the flash point of the paint solution, (5) electric conductivity, and (6) the surface tension of the paint.

With the use of the various sprayable paints, it has become evident that the technology of paint application was considerably affected by the shape of the workpiece, and especially by its deeper cavities. Therefore, in the course of operation the modification of certain parameters may become necessary, such as the replacement of the solvent by one of different conductivity, or the modification of the base material or of the binder. In addition, higher quality requirements may render necessary further tests in case of electrostatic spray. These tests aim at the determination of (7) the quality of electrostatic spray (angle of the spray cone, electrostatic dielectric constant, charging capacity of the paint, permittivity, the dipole moment and the grain distribution), further (8) the interaction of certain measured factors. The tests indicated under (7) and (8) have not been carried out up to now even in the paint and dye factories, which has caused troublesome uncertainty in use. Besides, paints or varnishes, certified by the factory as identical are not in fact of the same quality due to manufacturing inaccuracies, to contamination occurring during transportation and use, and to other factors. It is the object of the invention to simplify and combine the testing instruments used up to now, on the one hand, and to complete them with various elements which render possible also the tests mentioned under (7) and (8) on the other hand, whereby a general-purpose testing apparatus will be created, to be used at the site of application.

The main parts of the testing apparatus according to the invention are as follows: a high-voltage direct-current source built into the pedestal of the apparatus, preferably with a voltage-multiplying oscillator; a measuring head movable up and down above the object carrier and fixable in any required position, which consists of a viscosity measuring jar and of a needle valve vertically adjustable in the bottom orifice of a spray head fastened to the bottom of said jar; a choke resistance inserted between the current source and the measuring head, through which the measuring head receives the required voltage from the current source; a tubular insulator cap covering the choke resistance and the vertical guiding bar of the measuring head connected to said resistance; sight optics fastened to the pedestal of the apparatus opposite which a scale is provided on the said insulator cap; a vessel forming an integral unit for determining the flash point and from the bottom of which a spark exciting conical body extends upwards.

Figure 2:
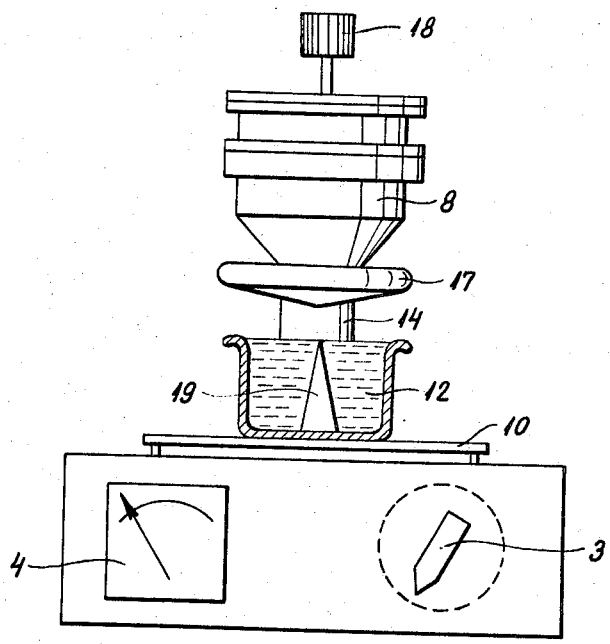

The application of the apparatus is described more fully with reference to the embodiment shown by way of example in the accompanying drawing. In the drawing FIG. 1 is a somewhat diagrammatic side view of the apparatus, FIG. 2 is a front view of the apparatus, together with the vessel for testing the flash point, however, omitting the sight optics.

A hollow pedestal 1 of the apparatus embodies a small current source 2 of 50 kv. rated voltage, the voltage of which may be adjusted by means of a potentiometer 3. The adjusted value of the voltage may be read on an instrument 4. The normal stage of the current source produces a voltage of 10 kv. which is increased by a multi-step voltage-multiplying oscillator up to 50 kv. The high direct voltage is led out through a choke resistance 6 to a measuring head, consequently no current of an intensity which may be harmful to the personnel may occur. A guiding bar 13 extends upwards through the choke resistance 6 on which a measuring head 7 may be slid up and down and may be fixed in the required position—by means not represented in the figure. A tubular cap 14 made of insulating material such as epoxy resin protects the choke resistance 6 and the guiding bar 13 against mechanical damage on the one hand, and prevents stray losses of the high-voltage direct current at this point, on the other. For the supporting arm 15 of the measuring head 7 a narrow vertical window 16 is cut in the wall of a cap 14.

The measuring head 7 consists of a standard viscosity measuring jar 8, to the conical open bottom of which a conventional spray head 17 of hollow disc shape is fastened. Through the narrow bottom orifice of this spray head the pin of the needle valve 9 protrudes, the height position of which may be adjusted through turning the button 18.

Onto the pedestal 1 of the apparatus the sight optics 11 are fastened, opposite which a scale division 5 is arranged on the side towards the optics of the cap 14. In addition, the grounded object carrier 10 is fastened to the pedestal 1. This object carrier represents the negative pole as against the needle valve 9 as positive pole, so that upon closing the circuit a homogeneous electrostatic field is produced between the needle valve and the object carrier.

Although an integral unit, the vessel 12 for measuring the flash point of the paint solution also belongs to the apparatus. From the bottom of said vassel 12 a conical body 19 extends upwards.

By means of the described apparatus the tests enumerated under (1) to (8) above may be readily and quickly carried out on the site of application. The dispersion pattern characterizing the quality of the electrostatic spray is produced so that the material to be tested is dropped from the jar 8 onto the object carrier 10 by displacing the needle valve 9. Then the diameter of the obtained dispersion pattern characterizes the conductivity of the material. The diameter of the dispersion pattern may be varied by increasing and reducing the field strength.

Spraying of the liquid thread emerging from the needle valve 9 begins sooner or later, depending on the surface tension. The length of the liquid thread preceding the starting point of the spray is characteristic of the surface tension, and the said length may be read by means of the sight optics off the scale division 5.

The sprayability, however, is influenced not only by the conductivity and surface tension but also by the dielectric constant and dipole moment of the paint. The data obtained with the aid of the apparatus according to the invention are much more reliable than could be hitherto obtained, and, in addition, they reflect the actual conditions. The dispersion pattern to be seen on the paper sheet located on the object carrier is also in accordance with the actual conditions, and may be compared at any time to the reference dispersion patterns.

The flash point of each material is tested so that the vessel 12 filled with the liquid test material is arranged on the object carrier 10 under the spray head 17, and after cutting in the voltage the measuring head 7 together with the spray head 17 is moved towards the vessel 12 until a light discharge takes place between the spray head 17 and the pin of the conic body 19, extending upwards from the bottom of the vessel 12. When producing a continuous sparking between the terminals it may be determined to which hazard group the tested material belongs with a view to ignition and whether it may be used for electrostatic spraying.

What we claim is:

1. General-purpose apparatus for testing the sprayability and other characteristics of paints and varnishes, comprising a grounded pedestal (1), a high-voltage direct current source (2) built into the said pedestal and provided with a voltage-multiplying oscillator; an object carrier (10) on the said pedestal; a vertical guiding bar (13); a measuring head (7) movable up and down on the guiding bar above the said object carrier and fixable in any required position, this measuring head consisting of a viscosity measuring jar (8) and of a needle valve (9) adjustable vertically in the bottom orifice of a spray head (17) fastened to the bottom of said jar; a choke resistance (6) inserted between the current source and the measuring head through which the measuring head receives the voltage from the current source; a tubular insulating cap (14) covering the choke resistance and the vertical guiding bar (13) of the measuring head connected to the said choke resistance; sight optics (11) fixed to the pedestal of the apparatus, opposite to which a scale division (5) is provided on the said insulating cap; a vessel (12) for testing the flash point, constituting a separable integral unit, from the bottom of which a metallic spark drawer conical body (19) extends upwards, this body being adapted to produce an electrostatic field between the said measuring head and the said object carrier.

References Cited

UNITED STATES PATENTS

| | | | |
|---|---|---|---|
| 2,629,255 | 2/1953 | Hartridge ----------- | 73—119 |
| 2,961,581 | 11/1960 | Grave et al. ------ | 239—15 XR |
| 3,096,640 | 7/1963 | Hewett et al. -------- | 73—36 |
| 3,164,012 | 1/1965 | Childs -------------- | 73—119 |
| 3,210,007 | 10/1965 | Doyle et al. ------ | 239—15 XR |
| 3,315,157 | 4/1967 | Watanabe et al. ------ | 324—62 |

DAVID SCHONBERG, *Primary Examiner.*